(12) United States Patent
Finger

(10) Patent No.: US 7,163,728 B2
(45) Date of Patent: *Jan. 16, 2007

(54) MULTI-LAYERED OPAQUE THERMALLY IMAGED LABEL

(76) Inventor: John Finger, 1471 Greystone La, Milford, OH (US) 45150

( * ) Notice: Subject to any disclaimer, the term of this patent is extended or adjusted under 35 U.S.C. 154(b) by 47 days.

This patent is subject to a terminal disclaimer.

(21) Appl. No.: 10/678,021

(22) Filed: Oct. 2, 2003

(65) Prior Publication Data

US 2004/0126530 A1  Jul. 1, 2004

Related U.S. Application Data

(60) Provisional application No. 60/415,403, filed on Oct. 2, 2002, provisional application No. 60/416,965, filed on Oct. 8, 2002, provisional application No. 60/440,463, filed on Jan. 1, 2003, provisional application No. 60/445,983, filed on Feb. 7, 2003, provisional application No. 60/448,328, filed on Feb. 19, 2003, provisional application No. 60/488,867, filed on Jul. 21, 2003.

(51) Int. Cl.
*B41M 5/40* (2006.01)
*B32B 33/00* (2006.01)

(52) U.S. Cl. .................... 428/40.1; 428/41.1; 503/200; 503/226; 427/152

(58) Field of Classification Search ............. 428/40.1, 428/41.1, 41.2; 503/200–226; 427/150–152
See application file for complete search history.

(56) References Cited

U.S. PATENT DOCUMENTS

| | | | |
|---|---|---|---|
| 4,314,415 A * | 2/1982 | De Woskin | 40/633 |
| 5,693,415 A * | 12/1997 | Zait et al. | 428/332 |
| 5,729,272 A | 3/1998 | Kikuchi | |
| 5,773,386 A | 6/1998 | Langan | |
| 5,798,179 A | 8/1998 | Kronzer | |
| 5,898,017 A * | 4/1999 | Chang | 503/204 |
| 6,124,236 A | 9/2000 | Mitchell, Jr. | |

(Continued)

FOREIGN PATENT DOCUMENTS

EP     0780241 A1   6/1997

(Continued)

*Primary Examiner*—Nasser Ahmad
*Assistant Examiner*—Patricia L. Nordmeyer
(74) *Attorney, Agent, or Firm*—Frost Borwn Todd LLC

(57) ABSTRACT

The thermal recording media of the present invention provides an intense image resistant to fade. Ideally there is provided a high Print Contrast Signal (PCS) image that greatly enhances reliable high-speed readability with a high percentage of accuracy in detecting the imaged areas when optical or electronic decoding devices and scanners are utilized. Uses include, but are not limited to security applications such as airline baggage tags, laminated durable labels for use in pathology, hematology, and general laboratory uses and on such applications as pre-stainer sample slides, ultraviolet thermal imaging durable labels, or durable labels for use on returnable totes or shipping containers. Generally, the thermal recording media of the present invention comprises: (a) a non-cavitated support material which incorporates a metal oxide layer on the first surface of the support material; and (b) either a direct thermal layer formed on the first surface of the metal oxide layer; or a ribbon to effect a thermal transfer of the desired image on to the first surface of the metal oxide layer.

2 Claims, 2 Drawing Sheets

U.S. PATENT DOCUMENTS

| | | | |
|---|---|---|---|
| 6,127,313 A * | 10/2000 | Defieuw et al. | 503/201 |
| 6,329,318 B1 | 12/2001 | McFall | |
| 6,476,840 B1 | 11/2002 | Taylor et al. | |
| 6,479,431 B1 | 11/2002 | McFall et al. | |
| 6,608,002 B1 | 8/2003 | Mitchell, Jr. | |
| 6,649,318 B1 * | 11/2003 | Gao et al. | 430/138 |
| 6,755,350 B1 * | 6/2004 | Rochford et al. | 239/34 |

FOREIGN PATENT DOCUMENTS

EP 0832757 A1 4/1998

* cited by examiner

MULTI-LAYERED OPAQUE THERMALLY IMAGED LABEL

This application is based on and claims priority from U.S. Provisional Patent Application Ser. No. 60/415,403 John Finger, filed Oct. 2, 2002, U.S. Provisional Patent Application Ser. No. 60/416,965, John Finger, filed Oct. 8, 2002, U.S. Provisional Patent Application Ser. No. 60/440,463, John Finger, filed Jan. 1, 2003, U.S. Provisional Patent Application Ser. No. 60/445,983, John Finger, filed Feb. 7, 2003, U.S. Provisional Patent Application Ser. No. 60/448,328, John Finger, filed Feb. 19, 2003, and U.S. Provisional Patent Application Ser. No. 60/488,867, John Finger, filed Jul. 21, 2003.

FIELD OF INVENTION

The present invention pertains to a thermally activated laminated recording media, and a method of making and using the same. In particular, it pertains to direct thermal and thermal transfer printed media that is chemical, abrasion, rub, scratch and/or temperature resistant and is legible in visible spectrum (from about 380 nm to about 760 nm), the near infrared spectrum (from about 720 nm to about 1400 nm) and the infrared spectrum (1400 to about 4000 nm).

BACKGROUND

A conventional thermal recording material comprises a support material made of, for example, a sheet of ordinary paper, synthetic paper, or a resin film, and a thermal recording layer, formed on the support material, on which images can be formed by application of heat thereto. Because of the capability of forming images by simple application of heat, such thermal recording materials are widely used with thermal printers for recording output information from computers, facsimile apparatus, telex, cash receipts, cash registers, and other information transmission and measuring instruments. Furthermore, such thermal recording materials are employed as adhesive labels as an identification device which is intended to be provided to the institution or business utilizing the device in such a manner that it may ultimately be imprinted with a bar code or other variable information which will identify the person or object to whom the identification device is applied.

SUMMARY OF THE INVENTION

The present invention comprises a multi-layered laminate construction and method of forming said construction, wherein the laminate may be thermally imaged. The construction of this laminate generally comprises a polymer support material having a first surface and second surface. The support layer may be either a non-cavitated polyolefin, polyester or blends thereof and is preferably a non-cavitated polyester selected from the group consisting of polycarbonate, polyethylene terephthalate (PET) and blends thereof. The support material is coated with a metal oxide, wherein the metal oxide is preferably a non-stoichiometric aluminum oxide. The metal oxide layer is covered with an active direct thermal layer, having a first and second surface. The active direct thermal layer comprises a color developing system reactive to transmissions of heat through either the first or second surface of the active direct thermal layer for forming images within the active direct thermal layer. The image formed may readable in the visible, UV and near-infrared. The first surface of the active direct thermal layer may be covered with a direct thermal top coat layer. In addition, this multi-layered laminate may also comprise a UV-cured chemical-resistant barrier topcoat generally covering the entire first of the laminate. applying concentrations of heat to said first surface of active direct thermal layer, resulting in the formation of images within said active direct thermal layer.

The multi-layered laminate may further comprise a primer layer that is applied to the first surface of the active direct thermal layer or the direct thermal topcoat layer, one or more color coating layers which may be applied in full or partial pattern coverage, which may be applied to the first surface of the active direct thermal layer or the first surface of the direct thermal top coat layer, a chemically-resistant pressure-sensitive adhesive applied to the second surface of the support material and a silicone-coated polyester release liner which is laminated to the second surface of the pressure-sensitive adhesive.

Uses include, but are not limited to security applications such as airline baggage tags, laminated durable labels for use in pathology, hematology, and general laboratory uses and on such applications as pre-stainer sample slides, ultraviolet thermal imaging durable labels, or durable labels for use on returnable totes or shipping containers.

DETAILED DESCRIPTION OF THE INVENTION

Figure 1:
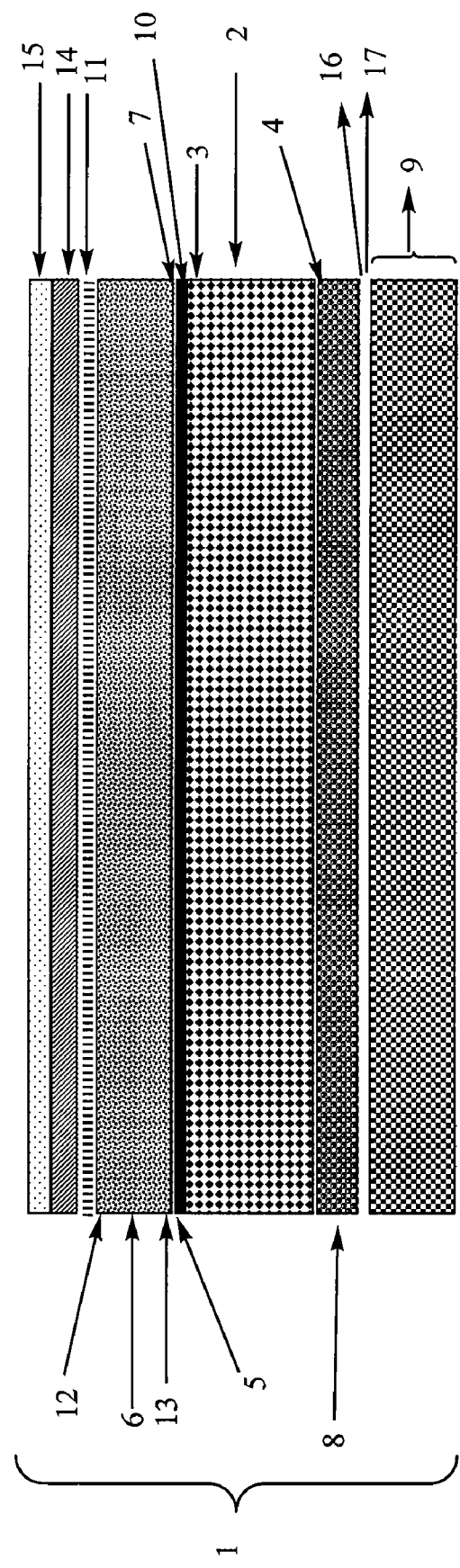
FIG. 1 is a schematic cross section of a first embodiment of the present invention as described in Example 1.
Figure 2:
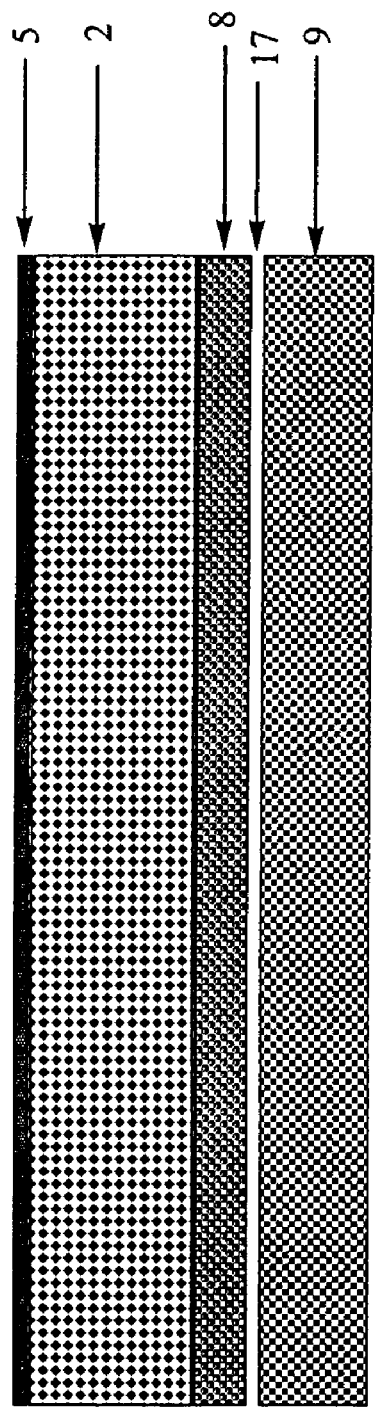
FIG. 2 is a schematic cross section of a second embodiment of the present invention as described in Example 2.
Figure 1:
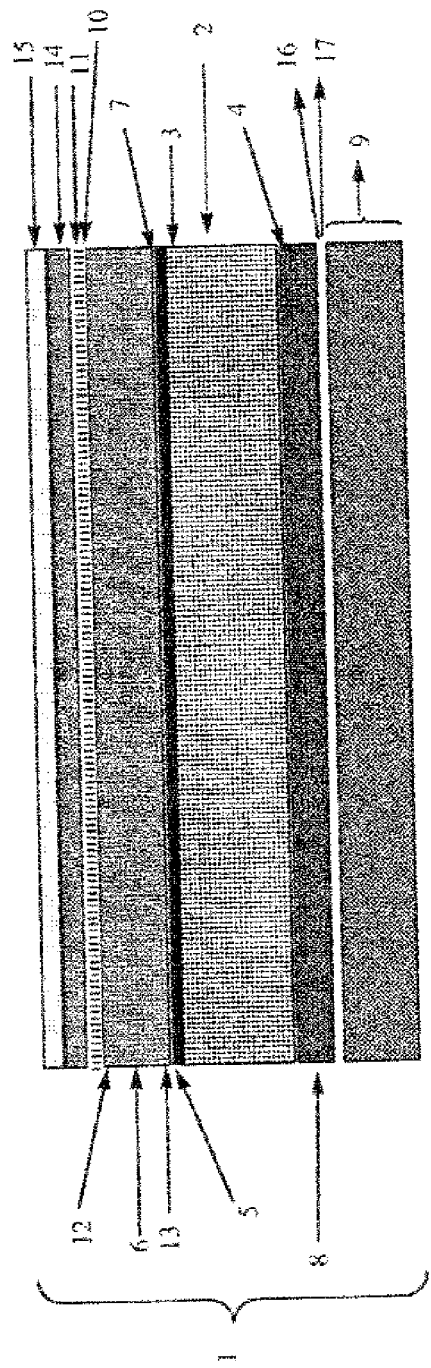
Figure 1:
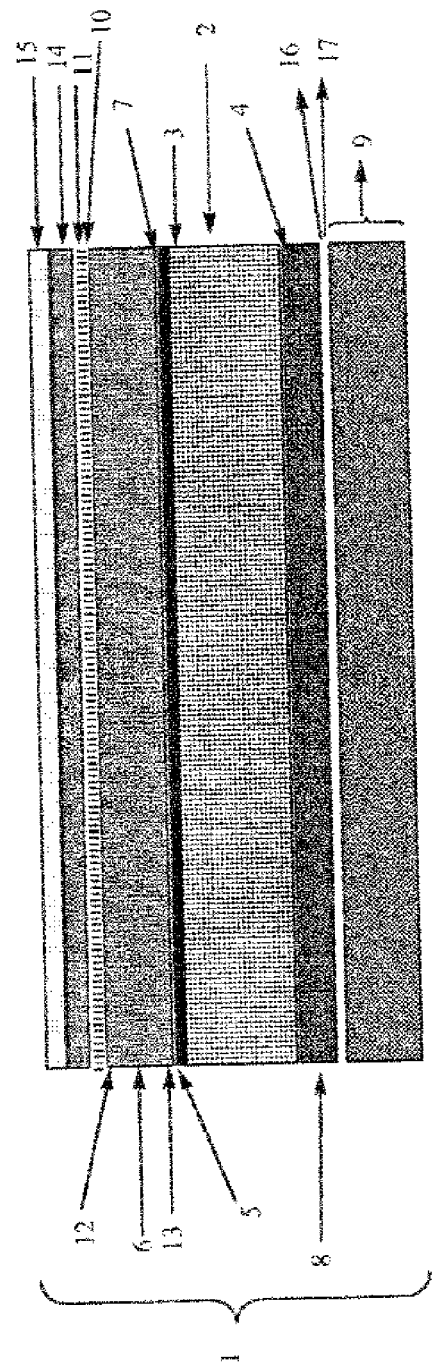

The thermal recording media of the present invention provides an image resistant to fade. Ideally there is provided a high Print Contrast Signal (PCS) image that greatly enhances reliable high-speed readability with a high percentage of accuracy in detecting the imaged areas when optical or electronic decoding devices and scanners are utilized. These imaged areas can be subsequently scanned in the ranges of 380 to 4000 nanometers using visible laser diode (VLD), light emitting diode (LED) scanners, as well as charge-coupled device (CCD) cameras. Uses include, but are not limited to security applications such as airline baggage tags, laminated durable labels for use in pathology, hematology, and general laboratory uses and on such applications as pre-stainer sample slides, ultraviolet thermal imaging durable labels, or durable labels for use on returnable totes or shipping containers.

Generally, the thermal recording media 1 of the present invention comprises: (a) a non-cavitated support material 2 which incorporates a metal oxide layer 5 on the first surface of the support material 3; and (b) a direct thermal image formed on the first surface of the metal oxide layer 7. This direct thermal image may be formed via direct thermal transfer by applying concentrations of heat to a first surface of an active direct thermal layer, resulting in the formation of images within the active direct thermal layer or by a thermal transfer ribbon.

In addition, this thermal recording media may also comprise a chemically resistant pressure-sensitive adhesive layer 8 that can be formed on the second surface of the support material 4. A release liner 9 may be attached to the adhesive layer 8 and can be peeled off the adhesive layer when the thermal recording adhesive label is used. Further, a primer layer 10 can be interposed between the first surface of the metal oxide coating 7 and the second surface of the direct thermal layer 13. This primer layer 10 acts as an insulator and also serves to block the penetration of the components of the direct thermal layer into the support material, thereby protecting the direct thermal layer. In addition, depending on the ultimate application for the laminate, the construction may further comprise a direct thermal top coat layer 11 on the first surface 12 of the direct thermal layer 6, and/or a radiation-curable topcoat 15 as the top surface of the laminate construction.

The Support Material 2:

The support material 2 may be paper or polymer, wherein the polymer is selected from the group consisting of polyolefins and polyesters. The support material may be of monolayer or of multi-layer construction, and it may be opaque sufficient to allow scanability of the final product, whether it be a label, a tag or the like. The support material should have dimensional stability, tear resistance and chemical resistance sufficient for the specific application. The support material should be non-cavitated and free of microvoids. The support material is coated with a substance that provides print receptivity and chemical resistance. Preferably, the coating substance is a metal oxide. More preferably, the coating is non-stoichiometric aluminum oxide. Most preferably, the non-stoichiometric aluminum oxide coating is applied by Hanita Coatings, Kibbutz Hanita, 22885, Israel, and is described by U.S. Pat. No. 5,693,415, which is herein incorporated by reference.

Polyolefins which may be used as the support material comprise polyethylene, polypropylene, mixtures thereof, and/or other known polyolefins. The polymeric support material may be a film or sheet and can be made by any process known in the art, including, but not limited to, cast sheet, cast film, or blown film. The film or sheet may be of monolayer or of multi-layer construction. Preferably, the polyolefin base layer comprises a non-cavitated polypropylene/high density polyethylene blend film. More preferably, a polyolefin support material comprises an opaque, non-cavitated, polypropylene/high density polyethylene blend blown film. These films are available from but not limited to: Charter Films, 1901 Winter Street, Superior, Wis. 54880; Trico Industries Inc. 190 Mike Street, North Kingston, R.I. 02852-0806; or Nan Ya Plastics Corporation USA, 9 Peach Tree Hill Road, Livingston, N.J. 07039.

Polyesters that may be used as the support material comprise either an opaque film or sheet and comprise non-cavitated polycarbonate, polyethylene terephthalate (PET) and combinations thereof. The polyester support material may be a film or sheet and can be made by any process known in the art, including, but not limited to, cast sheet, cast film, or blown film. The film or sheet may be of monolayer or of multi-layer construction. These films are available from but not limited to: E. I. DuPont de Nemours, DuPont Building, 1007 Market Street, Wilmington, Del. 19898, SKC America, 850 Clark Drive, Mount Olive, N.J. 07826; or Nan Ya Plastics Corporation USA, 9 Peach Tree Hill Road, Livingston, N.J. 07039.

Thermal Imaging Media:

Direct Thermal Layer

The thermal barrier and heat transfer properties of layers 4–6 and 10, respectively, allow high quality gray scale thermal record images to be achieved with selective thermal contact. The active direct thermal layer can be assembled from various systems known in the art and described in many patents, such as for example: U.S. Pat. Nos. 3,539,375; 3,674,535; 3,746,675; 4,151,748; 4,181,771; 4,246,318; and 4,470,057 which are incorporated herein by reference. In these systems, basic colorless or lightly colored chromogenic material and acidic color developer material are contained in a coating on a substrate which, when heated to a suitable temperature, melts or softens to permit said materials to react, thereby producing a colored mark. Thermally-responsive record materials have a characteristic thermal response, desirably producing a colored image of sufficient intensity upon selective thermal exposure. The image is non-reversible under the action of heat and has remarkable stability in part due to the barrier properties of layer 8 and 10. In the laminate construction of the invention the active direct thermal layer may be selected to be resistant to background discoloration when exposed to high heat environments in excess of 190° F.

The active direct thermal layer is typically a de-watered solid at ambient temperature. The color forming system of this invention is comprised of the electron donating dye precursors, also known as chromogenic material, in a substantially colorless state together with an acidic developer material. The color-forming reaction relies upon melting, softening, or subliming one or more of the components to achieve reactive, color-producing contact with the chromogen. Substantially colorless for purposes of the invention is understood to mean colorless or lightly or faintly colored.

The components of the active direct thermal layer are in substantially contiguous relationship, substantially homogeneously distributed throughout the coated layer or layers deposited on the substrate. For purposes of this invention the term substantially contiguous is understood to mean that the color-forming components are positioned in sufficient proximity such that upon melting, softening or subliming one or more of the components a reactive color forming contact between the components is achieved. As is readily apparent to the ordinary person skilled in this art, these reactive components accordingly can be in the same coated layer or layers, or individual components positioned in separate layers using multiple layers. In other words, one component can be positioned in the first layer and the other reactive components can be positioned in a subsequent layer or layers. All such arrangements are understood herein as being substantially contiguous.

The acidic developer to dye precursor ratio by weight is preferably maintained at from 1:1 to about 2:1. These color-forming system components are substantially insoluble in the dispersion vehicle (preferably water) and are typically ground to an individual particle size of less than 10 microns, preferably less than 3 microns.

The active direct thermal layer is held together by polymeric binder materials which can include both soluble and suspended polymeric agents. Examples include polyvinyl alcohol, hydroxy ethylcellulose, methylcellulose, methylhydroxypropylcellulose, starch, modified starches, gelatin, polyacrylates, styrene-butadiene-rubber latexes, polyvinylacetates, polystyrene, and the like. The polymeric binder also protects the color-forming system components from brushing and handling forces occasioned by storage and use of the thermal recording product. It should be present in an amount to afford such protection and in an amount less than will interfere with achieving reactive contact between the color-forming reactive materials.

The thermal recording layer can additionally contain pigments, such as clay, talc, silicon dioxide, aluminum hydroxide, calcined kaolin clay, calcium carbonate, and urea-formaldehyde resin. Other optional materials include natural waxes, Carnuba wax, synthetic waxes, lubricants such as zinc stearate, wetting agents, defoamers, sensitizers, UV inhibitors and antioxidants. Sensitizers typically do not impart a thermally recordable image when combined with a dye precursor, they are typically low melt point solids that act as a solvent to facilitate the commingling of the components in the color forming system. The total construction described in this invention provides heat insulating and transfer properties.

The direct thermal layer 6, when subjected to heat, provides a printed surface. The direct thermal layer is a thermally sensitive color-forming composition comprising electron donating dye precursor (chromogenic material) and acidic developer material. The recording media according to the invention has a non-reversible image in that under normal use conditions when a record or image is created, it is substantially non-reversible and stable for many months or even years. The color-forming composition (or system) of the recording media of this invention comprises chromogenic material (electron-donating dye precursor) in its substantially colorless state, and acidic developer material. The color-forming system of the direct thermal layer relies upon melting, softening, or subliming one or more of the components to achieve reactive, color-producing contact. The direct thermal layer can be imaged using a direct thermal printer. The direct thermal layer can be selected for a particular application. For example, chemical resistant durable labels for use in laboratory slides that will be subjected to heat during use may require a thermal coating with a higher initial activation temperature. In the case of high-speed sortation, thermal layer providing a higher print contrast ratio of light to dark allow improved readability of the printed image. Preferably, the direct thermal layer applied to a substrate is supplied by Appleton, 825 E. Wisconsin Ave., P.O. Box 359, Appleton, Wis. 54912-0359. Near-infrared chromogens can be optionally incorporated to enhance readability of imaged characters by optical or near infrared scanners.

The coating can optionally be applied to all of the substrate or spot printed on a certain portion. All such arrangements are understood herein as being substantially contiguous and would be readily apparent to the skilled artisan.

In manufacturing the direct thermal layer, a coating composition is prepared which includes a fine dispersion of the components of the color-forming system, polymeric binder material, surface active agents and other additives in an aqueous coating medium. The color-forming composition can additionally contain inert pigments, such as clay, talc, aluminum hydroxide, calcined kaolin clay and calcium carbonate; synthetic pigments, such as urea-formaldehyde resin pigments; natural waxes such as Carnuba wax; synthetic waxes; lubricants such as a zinc stearate; wetting agents; defoamers, UV stabilizers, and antioxidants. Sensitizers can also be optionally included. Sensitizers for example, can include acetoacet-o-toluidine, phenyl-1-hydroxy-2-naphthoate, 1,2-diphenoxyethane, or p-benzylbiphenyl or mixtures thereof. The sensitizer or modifier typically does not impart significant imaging on its own, but as a relatively low melt point solid, acts as a solvent to facilitate reaction between the components of the color-forming system.

The color-forming system components are substantially insoluble in the dispersion vehicle (preferably water) and are ground to an individual average particle size of between about 1 micron to about 10 microns, preferably about 1–3 microns. The polymeric binder material is substantially vehicle soluble although latexes are also eligible in some instances. Preferred water soluble binders include polyvinyl alcohol, hydroxy ethyl-cellulose, methylcellulose, methylhydroxypropylcellulose, starch, modified starches, gelatin and the like. Eligible latex materials include polyacrylates, sytrene-butadiene-rubber latexes, polyvinylacetates, polystyrene, and the like. The binder serves as an adherent and protects the thermal layer from brushing and handling forces occasioned by storage and use. Binder should be present in an amount to afford protection and in an amount less than will interfere with achieving reactive contract between color-forming reactive materials.

Coating weights can effectively be about 3 to about 9 grams per square meter (gsm) and preferably about 5 to about 6 gsm. The practical amount of color-forming materials is controlled by economic considerations, functional parameters and desired handling characteristics.

Eligible electron-donating dye precursors are chromogenic material. Chromogenic materials such as the phthalide, leucauramine and fluoran compounds, for use in the color-forming system are well known color-forming compounds. Examples of the compounds include Crystal Violet Lactone (3,3-bis(4-dimethylaminophenyl)-6-dimethylaminophthalide, U.S. Pat. No. RE 23,024); phenyl-, indol-, pyrrol-, and carbazol-substituted phthalides (for example, in U.S. Pat. Nos. 3,491,111; 3,491,112; 3,491,116; 3,509,174); nitro-, amino-, amido-, sulfon amido-, aminobenzylidene-, halo-, anilino-substituted fluorans (for example, the U.S. Pat. Nos. 3,624,107; 3,627,787; 3,641, 011; 3,642,828; 3,681,390); spirodipyrans (U.S. Pat. No. 3,971,808); and pyridine and pyrazine compounds (for example, in U.S. Pat. Nos. 3,775, 424 and 3,853,869). Other specifically eligible chromogenic compounds, not limiting the invention in any way, are: 3-diethylamino-6-methyl-7-anilino-flouran (U.S. Pat. No. 4,510,513) also known as 3-dibutylamino-6-methyl-7-anilino-fluoran; 3-dibutylamino-7-(2-chloroanilino) fluoran; 3-(N-ethyl-N-tetrahydrofurfurylamino)-6-methyl-7-3,5'6-tris(dimethylamino)spiro[9H-fluorene-9, 1'(3'H)-isobenzofuran]-3 '-one; 7-(1-ethyl-2-methylindol-3-yl)-7-(2-chloroanilino) fluoran (U.S. Pat. No. 3,920,510); 3-(N-methylcyclohexylamino)-6-methyl-7-anilinofluoran (U.S. Pat. No. 3,959,571); 7-(1-octyl-2-methylindol-3-yl)-7-(4-diethylamino-2-ethoxyphenyl)-5, 7-dihydrofuro[3,4-b]pyridin-5-one; 3-diethylamino-7,8-benzofluoran; 3,3-bis(1-ethyl-2-methylindol-3-yl)phthalide; 3-diethylamino-7-anilinofluoran; 3-diethylamino-7-benzylaminofluoran; 3'-phenyl-7-dibenzylamino-2,2'-spirodi-[2-H-1-benzopyran] and mixtures of any of the above.

Other known developer materials may also be included provided not used in an amount so as to detract from the functionality of the combination of the invention. Other acidic developer material include the compounds listed in U.S. Pat. No. 3,539,375 as phenolic reactive material, particularly the monophenols and diphenols. Acidic developer material also include, the following compounds: 4,4'-isopropylidinediphenol (Bisphenol A); p-hydroxybenzaldehyde; p-hydroxybenzophenone; p-hydroxypropiophenone; 2,4-dihydroxybenzophenone; 1,1-bis(4-hydroxyphenyl)cyclohexane; salicyanilide; 4-hydroxy-2-methylacetophenone; 2-acetylbenzoic acid; m-hydroxyacetanilide; p-hydroxyacetanilide; 2,4-dihydroxyacetophenone; 4-hydroxy-4'-methylbenzophenone; 4,4'-dihydroxybenzophenone; 2,2-bis(4-hydroxyphenyl)-4-methylpentane; benzyl 4-hydroxyphenyl ketone; 2,2-bis(4-hydroxyphenyl)-5-methylhexane; ethyl-4, 4-bis(4-hydroxyphenyl)-pentanoate; isopropyl-4,4-bis(4-hydroxyphenyl)pentanoate; methyl-4,4-bis(4-hydroxyphenyl)pentanoate; alkyl-4,4-bis(4-hydroxyphenyl) pentanoate; 3,3-bis (4-hydroxyphenyl)(-pentane; 4,4-bis (4-hydroxyphenyl)-heptane; 2,2-bis(4-hydroxypheyl)-1-phenylpropane; 2,2-bis(4-hydroxyphenyl)butane; 2,2'-methylenebis(4-ethyl-6-tertiarybutyl phenol); 4-hydroxycoumarin; 7-hydroxy-4-methylcoumarin; 2,2'-methylene-bis(4-octyl phenol); 4,4'-sulfonyldiphenol; 4,4'-thiobis(6-tertiarybutyl-m-cresol); methyl-p-hydroxybenzoate; n-propyl-phydroxybenzoate; and benzyl-p-hydroxybenzoate.

Examples of other developer compounds include phenolic novolak resins which are the product of reaction between, for example, formaldehyde and a phenol such as an alkylphenol, e.g., p-octylphenol, or other phenols such as p-phenylphenol, and the like; and acid mineral materials including colloidal silica, kaolin, bentonite, aftapulgite, hallosyte, and the like. Some of the polymers and minerals do not melt but undergo color reaction on fusion of the chromogen.

EXAMPLE OF DIRECT THERMAL LAYER

Ten grams of 2-anilino-3-methyl-6-dibutylamino fluoran are dispersed for 2 hours by means of a media mill together with 14 grams of 13% aqueous polyvinyl alcohol. Twenty grams of 4-hydroxy-4'-isopropoxysulfone are dispersed for 2 hours by means of a media mill together with 24 grams of a 9.5% solution of polyvinyl alcohol. Optionally 10 grams of 1,2-diphenoxy ethane are dispersed for 2 hours by means of a media mill together with 13 grams of a 11% solution of polyvinyl alcohol. The dispersions can be mixed together and a binder of styrene-butadiene latex and polyvinyl alcohol added. The coating is applied to a substrate such that the amount of coating is around 3 grams per square meter. The coating is dried and an optional top coat also applied. The second coating can be optionally calendared.

Direct Thermal Topcoat Layer (11)

Optionally, the active direct thermal layer can be topcoated (11). This layer provides a barrier that prevents contaminants from contacting the active direct thermal layer or slows their penetration. It also protects the color-forming system components from brushing and handling forces occasioned by storage and use of the thermal recording product. It provides a unique tie layer between the active direct thermal layer (6) and the topcoat (15) with good interfacial adhesion. Optionally, the thermally-sensitive color-forming composition can be overcoated with a protective layer top coat or barrier layer formed from one or more water soluble or dispersible polymeric materials such as polyvinyl alcohol, carboxylated polyvinyl alcohol, methyl or ethyl cellulose, polyacrylamide, gelatin, starch or polyvinyl pyrrolidone. Lubricants, antioxidants, UV inhibitors, waxes and other materials to improve physical handling and shelf stability properties can also be optionally included.

Direct thermal topcoat layers are well known in the art. They consist of pigments, binder, and crosslinker substantially homogeneously distributed throughout the coated layer or layers. The ratios of the materials can be varied depending on the balance of barrier and printing properties needed. Most of the needs can be covered by varying the pigment from 0–80 dry wt %, the binder from 10–90 dry wt %, and the crosslinker from 0–30 dry wt %. The pigments can include clay, talc, silicon dioxide, aluminum hydroxide, calcined kaolin clay, calcium carbonate, and urea-formaldehyde resin. Examples of the binders include polyvinyl alcohol, hydroxy ethylcellulose, methylcellulose, methylhydroxypropylcellulose, starch, modified starches, gelatin, polyacrylates, styrene-butadiene-rubber latexes, polyvinylacetates, polystyrene, and the like.

Thermal Transfer Ribbon:

The thermal transfer ribbon transfers an ink to a surface when subjected to heat. Thermal transfer ribbon technology is well known in the art (see U.S. Pat. No. 5,729,272, Kikuchi, issued Mar. 17, 1998, which is herein incorporated by reference). The thermal transfer inked ribbon can be selected for a particular application. For example, chemical resistant durable labels for use in laboratory slides that may require a resin composition that when radiation cured forms an image that is not altered when subjected to solvents, cleaners, stains or low or high temperatures. Due to the high contrast normally associated with thermal transfer printing these labels can be utilized in high-speed sortation as the PCS (print contrast signal) is usually high when printed on a white substrate. Preferably the thermal transfer ribbon is supplied under U.S. Pat. No. 6,476,840, Taylor et al., issued Nov. 5, 2002, which is herein incorporated by reference.

Optional Layers:

Optionally, the laminate may further comprise one or more of the following layers: (i) a radiation-curable top coat 15 applied as the top layer of the laminate; (ii) a primer layer 10 which may be applied to the first surface of the direct thermal layer 12 or the top layer of the direct thermal top coat layer; and (iii) one or more color coating layers 14 applied to a direct thermal topcoat layer 11 or the first surface of the direct thermal layer 12. In addition, the durable label may further comprise an adhesive layer 8 applied to the second surface of the support material 4.

The Radiation-Curable Topcoat Layer 15

The radiation-curable topcoat layer is a clear coat that provides chemical or abrasion resistance. The topcoat may contain epoxy acrylate oligomers, a mixture of multifunctional acrylate monomers, photoinitators, and flow and leveling additives. The multifunction acrylate monomers may include hexanediol diacrylate, tripropylenediol diacrylate, trimethylol triacrylate. The radiation curing may be accomplished by the use of ultraviolet light. Therefore, photo initiating components such as dimethylhydroxy acetophenone or derivatives of dimethylhydroxy acetophenone, benzildimethyl ketal or derivatives of benzildimethyl ketal, 2,4,6-trimethylbenzoyl phenyl, or phosphineoxide may be used to start the cross linking process. The topcoat layer can be applied by any method known in the art. Examples of application methods include, but are not limited to flexography, screen-printing, offset, gravure, or Meyer rod. Preferably, this coating is printed on the top surface of the laminate and is radiation curable. More preferably, the topcoat layer is ultraviolet curable and crosslinked. Most preferably, the topcoat layer is a barrier topcoat developed by Northwest Coating, 7221 S.10$^{th}$ Street, Oak Creek Wis. 53154, or Water Ink Technologies, 6001 Harris Technology Blvd., Charlotte, N.C. 29269.

The Color Coating Layer 14

The color coating layer 14 can be applied to provide additional information or printing, for example, an organization's trade mark or other identifying information. Color coatings are well known in the art and can be applied by any methods known in the art which include, but are not limited to flexography, screen printing, or offset. The color-coating layer can comprise of an ink or pigment.

The Primer Layer 10

The primer layer 10 insulates the thermal coating to enhance the printing quality and promote adhesion to the base layer. Materials suitable for use in a primer layer are well known in the art Primer layers can include binders and can include polyvinyl alcohol, hydroxy ethyl-cellulose, methylcellulose, methyl-hydroxypropylcellulose, starch, modified starches, gelatin, latexes and the like. Eligible latex materials include polyacrylates, sytrene-butadiene-rubber latexes, polyvinylacetates, polystyrene, and the like. Other optional precoats or primer layers include clay, and absorptive pigments such as kaolin clays, insulators such as hollow sphere particles, pigments, particulate clays, starch, or synthetic polymeric materials. Hollow sphere particles, for example, are commercially available such as the "Ropaque" materials of Rohm and Haas. The primer thickness should be chosen to provide the proper level of insulation and adhesion. The radiation-curable top coat, primer layer and direct thermal layer can be applied by any methods known in the art. Preferably, they are applied and the thickness controlled using a Meyer rod or metering wire wound rod.

The Adhesive 8

An adhesive 8 suitable for a particular application can be applied to the second surface of the support material 4. The adhesive can be applied by any method known in the art. The adhesive is typically a pressure sensitive composition. The adhesive may be 100% solid, solvent or of an aqueous nature and can be applied directly to the second surface or transfer coated by means of a Meyer rod or gravure.

Release Liner 16 and Silicon Coating Layer 17

During transfer coating, the adhesive is applied directly to a release liner 9, cured, and then the liner is laminated to the second surface of the label to form a pressure sensitive label. Release liners are well known in the art. These release liners can be paper or film and contain both first and second surfaces. Typically the first surface of the liner 16 has a silicone coating layer 17. The silicone-coated surface facilitates the application of the adhesive and in the case of transfer coating, allows the release liner 9 to be removed thus exposing the adhesive. In the case of a direct coating, the adhesive 8 is applied to the second surface of the support material 4 and the silicone-coated side of release liner 16 is then laminated to the adhesive surface. The release liner 9 provides protection to the adhesive and for further processing of the label material such as die cutting and printing. At this point the label can be removed from the silicone coated release liner and then be adhered to the desired surface for identification.

EXAMPLE 1

A laminated durable label, for use in pathology, hematology, and general laboratory uses for such applications as pre-stainer sample slide labels, comprises: (1) a UV-cured chemical-resistant barrier topcoat 15 generally covering the entire first surface, which may be applied by flexography, offset, screen-printing or other similar techniques; (2) a color coating layer 14 which is applied in full or partial/pattern coverage; these coating is utilized for fixed field information or esthetic purposes and is applied to the first surface of the binder layer by methods such as flexography offset, screen-printing and other similar techniques; (3) a binder layer 11 which is utilized to provide an intermediate layer that improves environmental protection of the direct thermal layer; this binder layer is applied and metered with a Meyer rod; (4) direct thermal layer 6; (5) a support material 2 comprising 2.0 mil polyester base layer coated on first surface 3 with an aluminum oxide layer 5, prepared by Hanita Coatings; (6) a chemical resistant adhesive 8; and (7) 1.5 mil polyester release liner 9 with a silicone coating 17.

EXAMPLE 2

A durable label for use in pathology, hematology, and general laboratory uses for such applications as pre-stainer sample slide labels and comprises an opaque polyethylene terephthalate support material 2 coated with aluminum oxide 5 as prepared by Hanita Coatings and is printed with a radiation curable printing ribbon. Labels of this embodiment can be used in applications such as paint mask labels that are solvent resistant and can be wiped clean of any paint without disturbing the printed label. Other labels of this embodiment can be used as labels on car parts for use under the automobile hood or in application of extreme heat and /or abrasion.

EXAMPLE 3

A durable label for use in pathology, hematology, and general laboratory uses on such applications as pre-stainer sample slide labels comprises a UV cured chemical resistant barrier topcoat, optional color coatings, binder, thermal coating, 2.5 mil 80/20 polypropylene/HDPE blend base layer, a chemical resistant adhesive and 40# siliconized release paper.

EXAMPLE 4

A durable label for use on, for example, returnable totes or shipping containers, comprises a UV cured scuff resistant barrier topcoat, optional color coatings, binder, thermal coating, primer, 3.5 mil 80/20 polypropylene/HDPE blend base layer, acrylic removable adhesive, 40# siliconized release paper.

EXAMPLE 5

A durable label for use as a tag comprises UV cured scuff resistant barrier topcoat, optional color coatings, binder, thermal coating, primer, 7.35 mil polypropylene/HDPE blend base layer.

EXAMPLE 6

A polyester base layer that is printed with a radiation curable printing ribbon. The polyester base layer can be coated with a reactive coating that provides print receptivity and chemical resistance. The reactive coating can be applied by Hanita Coatings, Kibbutz Hanita, 22885 Israel. It comprises a reactive deposition of nonferrous materials performed under vacuum. Preferably, the polyester base layer polyethylene terephthalate.

The durable label of this third embodiment is rub, scratch, chemical and temperature resistant without requiring an overlaminant. Labels of this third embodiment can be used in applications such as paint mask labels that are paint resistant and can be wiped clean of any paint without disturbing the printed label. Other labels of this embodiment can be used as labels on car parts for use under the automobile hood.

An ultraviolet thermal imaging durable label comprises a reactive coating, a 2 mil white polyethylene terephthalate base layer, a chemical resistant adhesive and 50# siliconized release paper.

What is claimed is:

1. A multi-layered opaque, laminated label able to be thermally imaged consisting of:

a) a support material having a first surface and second surface, wherein the support material is an opaque, non-cavitated polyester selected from the group consisting of polycarbonate, polyethylene terephthalate (PET) and blends thereof, and the first surface of the support material is coated with a non-stoichiometric aluminum oxide having a first surface;

b) an active direct thermal layer, having a first and second surface, overlying said first surface of the non-stoichiometric aluminum oxide layer, said active direct thermal layer having a chromogenic material for a color developing mechanism reactive to transmissions of heat through either the first or second surface of the active direct thermal layer for forming images within the active direct thermal layer;

c) a primer layer, having a first and second surface, wherein the second surface of the primer layer is applied to the first surface of the active direct thermal layer;

d) a direct thermal top coat, having a first and second surface, wherein the second surface is applied to the first surface of the primer layer;

e) one or more color coating layers, having a first and second surface, wherein the second surface is applied to the first surface of the direct thermal top coat layer;

f) a radiation-curable topcoat which is applied to the first surface of the color coating layer(s);

g) a chemically-resistant pressure-sensitive adhesive, having a first and second surface, which is applied to the second surface of the support material;

h) a silicone-coated release liner which is laminated to the second surface of the pressure-sensitive adhesive.

2. The multi-layered laminate construction of claim 1 wherein the image formed is readable in the near-infrared.

* * * * *

UNITED STATES PATENT AND TRADEMARK OFFICE
CERTIFICATE OF CORRECTION

| | | |
|---|---|---|
| PATENT NO. | : 7,163,728 B2 | Page 1 of 2 |
| APPLICATION NO. | : 10/678021 | |
| DATED | : January 16, 2007 | |
| INVENTOR(S) | : John Finger | |

It is certified that error appears in the above-identified patent and that said Letters Patent is hereby corrected as shown below:

Please replace Figure 1 with the enclosed revised Figure 1, that is illustrated on the attached page.

Column 2, line 29, "...as described in Example 1.", please replace with, "as described in Example 1 additionally including primer layer 10."

Signed and Sealed this

Fourteenth Day of April, 2009

JOHN DOLL
*Acting Director of the United States Patent and Trademark Office*

UNITED STATES PATENT AND TRADEMARK OFFICE
CERTIFICATE OF CORRECTION

PATENT NO.         : 7,163,728 B2
APPLICATION NO. : 10/678021
DATED                 : January 16, 2007
INVENTOR(S)        : John Finger It is certified that error appears in the above-identified patent and that said Letters Patent is hereby corrected as shown below:

Delete the title page and substitute therefor the attached title page.

Please replace Figure 1 with the enclosed revised Figure 1, that is illustrated on the attached page.

Column 2, line 29, "...as described in Example 1.", please replace with, "as described in Example 1 additionally including primer layer 10.".

This certificate supersedes the Certificate of Correction issued April 14, 2009.

Signed and Sealed this

Fifth Day of May, 2009

JOHN DOLL
*Acting Director of the United States Patent and Trademark Office*

United States Patent
Finger

(10) Patent No.: US 7,163,728 B2
**(45) Date of Patent: *Jan. 16, 2007**

(54) MULTI-LAYERED OPAQUE THERMALLY IMAGED LABEL

(76) Inventor: John Finger, 1471 Greystone La., Milford, OH (US) 45150

( * ) Notice: Subject to any disclaimer, the term of this patent is extended or adjusted under 35 U.S.C. 154(b) by 47 days.

This patent is subject to a terminal disclaimer.

(21) Appl. No.: 10/678,021

(22) Filed: Oct. 2, 2003

(65) Prior Publication Data

US 2004/0126530 A1 Jul. 1, 2004

Related U.S. Application Data

(60) Provisional application No. 60/415,403, filed on Oct. 2, 2002, provisional application No. 60/416,965, filed on Oct. 8, 2002, provisional application No. 60/440,463, filed on Jan. 1, 2003, provisional application No. 60/445,983, filed on Feb. 7, 2003, provisional application No. 60/448,328, filed on Feb. 19, 2003, provisional application No. 60/488,867, filed on Jul. 21, 2003.

(51) Int. Cl.
*B41M 5/40* (2006.01)
*B32B 33/00* (2006.01)

(52) U.S. Cl. ............... 428/40.1; 428/41.1; 503/200; 503/226; 427/152

(58) Field of Classification Search ......... 428/40.1, 428/41.1, 41.2; 503/200–226; 427/150–152
See application file for complete search history.

(56) References Cited

U.S. PATENT DOCUMENTS

| | | | | |
|---|---|---|---|---|
| 4,314,415 A | * | 2/1982 | De Woskin | 40/633 |
| 5,693,415 A | * | 12/1997 | Zait et al. | 428/332 |
| 5,729,272 A | | 3/1998 | Kikuchi | |
| 5,723,386 A | | 6/1998 | Langan | |
| 5,798,179 A | | 8/1998 | Kresner | |
| 5,898,017 A | * | 4/1999 | Chang | 503/204 |
| 6,124,236 A | | 9/2000 | Mitchell, Jr. | |

(Continued)

FOREIGN PATENT DOCUMENTS

EP 0780241 A1 6/1997

(Continued)

*Primary Examiner*—Nasser Ahmad
*Assistant Examiner*—Patricia L. Nordmeyer
(74) *Attorney, Agent, or Firm*—Frost Brown Todd LLC

(57) ABSTRACT

The thermal recording media of the present invention provides an intense image resistant to fade. Ideally there is provided a high Print Contrast Signal (PCS) image that greatly enhances reliable high-speed readability with a high percentage of accuracy in detecting the imaged areas when optical or electronic decoding devices and scanners are utilized. Uses include, but are not limited to security applications such as airline baggage tags, laminated durable labels for use in pathology, hematology, and general laboratory uses and on such applications as pre-stainer sample slides, ultraviolet thermal imaging durable labels, or durable labels for use on returnable totes or shipping containers. Generally, the thermal recording media of the present invention comprises: (a) a non-cavitated support material which incorporates a metal oxide layer on the first surface of the support material; and (b) either a direct thermal layer formed on the first surface of the metal oxide layer; or a ribbon to effect a thermal transfer of the desired image on to the first surface of the metal oxide layer.

2 Claims, 2 Drawing Sheets

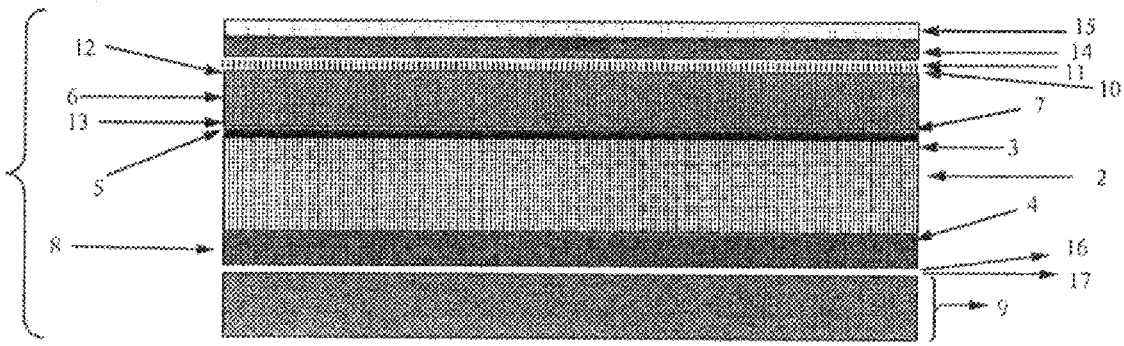

UNITED STATES PATENT AND TRADEMARK OFFICE
CERTIFICATE OF CORRECTION

PATENT NO.         : 7,163,728 B2
APPLICATION NO. : 10/678021
DATED               : January 16, 2007
INVENTOR(S)       : John Finger Page 1 of 1

It is certified that error appears in the above-identified patent and that said Letters Patent is hereby corrected as shown below:

Title page Item [73] should read
Assignee of the patent as: --General Data Company, Inc.--

Signed and Sealed this

Twenty-third Day of June, 2009

JOHN DOLL
*Acting Director of the United States Patent and Trademark Office*